United States Patent [19]
Benhammou et al.

[11] Patent Number: 5,991,519
[45] Date of Patent: Nov. 23, 1999

[54] SECURE MEMORY HAVING MULTIPLE SECURITY LEVELS

[75] Inventors: Jean-Pierre Benhammou; Dennis F. Baran; Phillip D. Tonge, all of Colorado Springs; Edward L. Terry, Jr., Widefield, all of Colo.

[73] Assignee: Atmel Corporation, Sunnyvale, Calif.

[21] Appl. No.: 08/943,510

[22] Filed: Oct. 3, 1997

[51] Int. Cl.⁶ .............................. G06F 11/00; G06F 7/04; G07D 7/00
[52] U.S. Cl. .............. 395/188.01; 395/186; 340/825.31; 340/825.32; 340/825.34
[58] Field of Search .............................. 395/186, 188.01; 340/825.32, 825.31, 825.34

[56] References Cited

U.S. PATENT DOCUMENTS

| | | | |
|---|---|---|---|
| 4,758,718 | 7/1988 | Fujisaki et al. | 235/487 |
| 5,508,691 | 4/1996 | Castleman et al. | 340/825.31 |
| 5,606,315 | 2/1997 | Gaskins | 340/825.34 |
| 5,699,514 | 12/1997 | Durinovic-Johri et al. | 395/188.01 |
| 5,774,546 | 6/1998 | Handelman et al. | 380/4 |

*Primary Examiner*—Robert W. Beausoliel, Jr.
*Assistant Examiner*—Norman Michael Wright
*Attorney, Agent, or Firm*—D'Alessandro & Ritchie

[57] ABSTRACT

According to the present invention, a secured memory comprises a first level security zone having an access code controlling access to the secured memory prior to an issuer fuse being blown, a security code attempts counter preventing access to the secured memory when a predetermined number of attempts at matching the access code have been made prior to resetting the security code attempts counter, a plurality of application zones, each of the plurality of application zones comprising: a storage memory zone, an application security zone having an application zone access code controlling access to the storage memory zone after an issuer fuse has been blown, an application zone security code attempts counter preventing access to the application zone when a predetermined number of attempts at matching the application zone access code have been made prior to resetting the application zone security code attempts counter, an erase key partition having an erase key code controlling erase access to the storage memory zone after an issuer fuse has been blown, and an erase key attempts counter preventing erase access to the application zone when a predetermined number of attempts at matching the erase key code have been made prior to resetting the erase key attempts counter.

1 Claim, 17 Drawing Sheets

| MEMORY PARTITIONS | ADDRESSES | BITS | BYTES |
|---|---|---|---|
| Fabrication Zone (FZ) | 0-15 | 16 | 2 |
| Issuer Zone (IZ) | 16-79 | 64 | 8 |
| Security Code (SC) | 80-95 | 16 | 2 |
| Security Code Attempts Counter (SCAC) | 96-103 | 8 | 1 |
| Code Protected Zone (CPZ) | 104-167 | 64 | 8 |
| Application Zone I Security Code (SCI) | 168-183 | 16 | 2 |
| Application Zone I SC I Attempts Counter (SLAC) | 184-191 | 8 | 1 |
| Application Zone I Erase Key (EZ1) | 192-207 | 16 | 2 |
| Application Zone I EZ1 Attempts Counter (E1AC) | 208-215 | 8 | 1 |
| Application Zone I (SMZ1) Storage Memory Zone | 216-4311 | 4096 | 512 |
| Application Zone 2 Security Code (SC2) | 4312-4327 | 16 | 2 |
| Application Zone 2 SC2 Attempts Counter (S2AC) | 4328-4335 | 8 | 1 |
| Application Zone 2 Erase Key (EZ2) | 4336-4351 | 16 | 2 |
| Application Zone 2 EZ2 Attempts Counter (E2AC) | 4352-4359 | 8 | 1 |
| Application Zone 2 (SMZ2) Storage Memory Zone | 4360-8455 | 4096 | 512 |
| Application Zone 3 Security Code (SC3) | 8456-8471 | 16 | 2 |
| Application Zone 3 SO Attempts Counter (S3AC) | 8472-8479 | 8 | 1 |
| Application Zone 3 Erase Key (EZ3) | 8480-8495 | 16 | 2 |
| Application Zone 3 EZ3 Attempts Counter (E3AC) | 8496-8503 | 8 | 1 |
| Application Zone 3 (SMZ3) Storage Memory Zone | 8504-12599 | 4096 | 512 |
| Application Zone 4 Security Code (SC4) | 12600-12615 | 16 | 2 |
| Application Zone 4 SC4 Attempts Counter (S4AC) | 12616-12623 | 8 | 1 |
| Application Zone 4 Erase Key (EZ4) | 12624-12639 | 16 | 2 |
| Application Zone 4 EZ4 Attempts Counter (E4AC) | 12640-12647 | 8 | 1 |
| Application Zone 4 (SMZ4) Storage Memory Zone | 12648-16303 | 3656 | 457 |
| Memory Test Zone (MTZ) | 16304-16319 | 16 | 2 |
| TOTAL ADDRESSABLE EEPROM MEMORY | | 16319 | 2011 |
| FUSE | 16352-16367 | | |
| Last Address | 16383 | | |

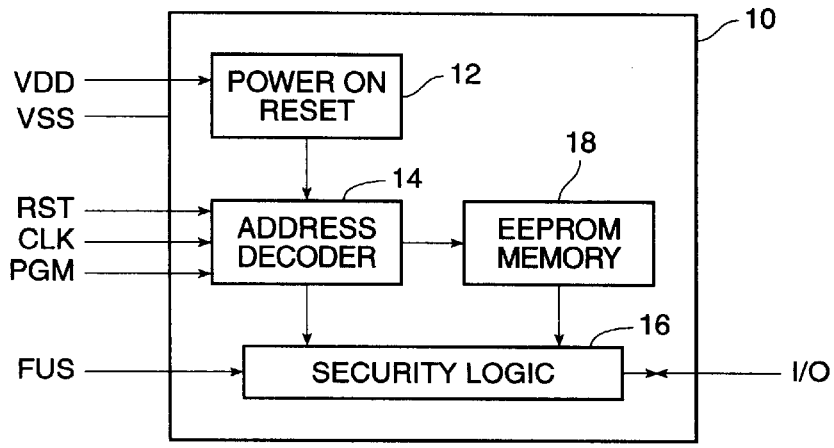

FIG. 1

| MEMORY PARTITIONS | ADDRESSES | BITS | BYTES | |
|---|---|---|---|---|
| Fabrication Zone (FZ) | 0-15 | 16 | 2 | |
| Issuer Zone (IZ) | 16-79 | 64 | 8 | 22 |
| Security Code (SC) | 80-95 | 16 | 2 | |
| Security Code Attempts Counter (SCAC) | 96-103 | 8 | 1 | |
| Code Protected Zone (CPZ) | 104-167 | 64 | 8 | |
| Application Zone 1 Security Code (SCI) | 168-183 | 16 | 2 | |
| Application Zone 1 SC I Attempts Counter (SLAC) | 184-191 | 8 | 1 | |
| Application Zone 1 Erase Key (EZ1) | 192-207 | 16 | 2 | |
| Application Zone 1 EZ1 Attempts Counter (E1AC) | 208-215 | 8 | 1 | |
| Application Zone 1 (SMZ1) Storage Memory Zone | 216-4311 | 4096 | 512 | |
| Application Zone 2 Security Code (SC2) | 4312-4327 | 16 | 2 | |
| Application Zone 2 SC2 Attempts Counter (S2AC) | 4328-4335 | 8 | 1 | |
| Application Zone 2 Erase Key (EZ2) | 4336-4351 | 16 | 2 | |
| Application Zone 2 EZ2 Attempts Counter (E2AC) | 4352-4359 | 8 | 1 | 24 |
| Application Zone 2 (SMZ2) Storage Memory Zone | 4360-8455 | 4096 | 512 | |
| Application Zone 3 Security Code (SC3) | 8456-8471 | 16 | 2 | |
| Application Zone 3 SO Attempts Counter (S3AC) | 8472-8479 | 8 | 1 | |
| Application Zone 3 Erase Key (EZ3) | 8480-8495 | 16 | 2 | |
| Application Zone 3 EZ3 Attempts Counter (E3AC) | 8496-8503 | 8 | 1 | |
| Application Zone 3 (SMZ3) Storage Memory Zone | 8504-12599 | 4096 | 512 | |
| Application Zone 4 Security Code (SC4) | 12600-12615 | 16 | 2 | |
| Application Zone 4 SC4 Attempts Counter (S4AC) | 12616-12623 | 8 | 1 | |
| Application Zone 4 Erase Key (EZ4) | 12624-12639 | 16 | 2 | |
| Application Zone 4 EZ4 Attempts Counter (E4AC) | 12640-12647 | 8 | 1 | |
| Application Zone 4 (SMZ4) Storage Memory Zone | 12648-16303 | 3656 | 457 | |
| Memory Test Zone (MTZ) | 16304-16319 | 16 | 2 | 26 |
| TOTAL ADDRESSABLE EEPROM MEMORY | | 16319 | 2011 | 28 |
| FUSE | 16352-16367 | | | |
| Last Address | 16383 | | | |

FIG. 2

| ZONES | SV | Rn | READ | ERASE | WRITE | COMPARE |
|---|---|---|---|---|---|---|
| FZ | X | X | yes | no | no | no |
| IZ | 0 | X | yes | no | no | no |
|    | 1 | X | yes | yes | yes | no |
| 5C | 0 | X | no | no | no | yes |
|    | 1 | X | yes | yes | yes | no |
| SCAC | 0 | X | yes | no | yes | no |
|      | 1 | X | yes | yes | yes | no |
| CPZ | 0 | X | yes | no | no | no |
|     | 1 | X | yes | yes | yes | no |
| SCn | 0 | X | no | no | no | no |
|     | 1 | X | yes | yes | yes | no |
| SLAC | 0 | X | yes | no | no | no |
|      | 1 | X | yes | yes | yes | no |
| EZn | 0 | X | no | no | no | no |
|     | 1 | X | yes | yes | yes | no |
| EnAC | 0 | X | yes | no | no | no |
|      | 1 | X | yes | yes | yes | no |
| SHZn | 0 | 0 | no | no | no | no |
|      | 0 | 1 | yes | no | no | no |
|      | 1 | X | yes | yes | yes | no |
| MTZ | X | X | yes | yes | yes | no |

*FIG. 9*

| ZONES | SV | Sn | Pn | Rn | En | READ | ERASE | WRITE | COMPARE |
|---|---|---|---|---|---|---|---|---|---|
| FZ | X | X | X | X | X | yes | no | no | no |
| IZ | X | X | X | X | X | yes | no | no | no |
| SC | 0 | X | X | X | X | no | no | no | yes |
|    | 1 | X | X | X | X | no | yes | yes | no |
| SCAC | 0 | X | X | X | X | yes | no | yes | no |
|      | 1 | X | X | X | X | yes | yes | yes | no |
| CPZ | 0 | X | X | X | X | yes | no | no | no |
|     | 1 | X | X | X | X | yes | yes | yes | no |
| SCn | 0 | X | X | X | X | no | no | no | no |
|     | 1 | 0 | X | X | X | no | no | no | yes |
|     | 1 | 1 | X | X | X | no | yes | yes | no |
| SnAC | 0 | X | X | X | X | yes | no | no | no |
|      | 1 | 0 | X | X | X | yes | no | yes | no |
|      | 1 | 1 | X | X | X | yes | yes | yes | no |
| EZn | 0 | X | X | X | X | no | no | no | no |
|     | 1 | 0 | X | X | 0 | no | no | no | no |
|     | 1 | 1 | X | X | 0 | no | no | no | yes |
|     | 1 | 1 | X | X | 1 | no | yes | yes | no |
| EnAC | 0 | X | X | X | X | yes | no | no | no |
|      | 1 | 0 | X | X | 0 | yes | no | no | no |
|      | 1 | 1 | X | X | 0 | yes | no | yes | no |
|      | 1 | 1 | X | X | 1 | yes | yes | yes | no |
| AZn | X | 0 | X | 0 | X | no | no | no | no |
|     | X | 0 | X | 1 | X | yes | no | no | no |
|     | 1 | 1 | 0 | X | 0 | yes | no | no | no |
|     | 1 | 1 | 0 | X | 1 | yes | yes | no | no |
|     | 1 | 1 | 1 | X | 0 | yes | no | yes | no |
|     | 1 | 1 | 1 | X | 1 | yes | yes | yes | no |
| MTZ | X | X | X | X | X | yes | yes | yes | no |

*FIG. 11*

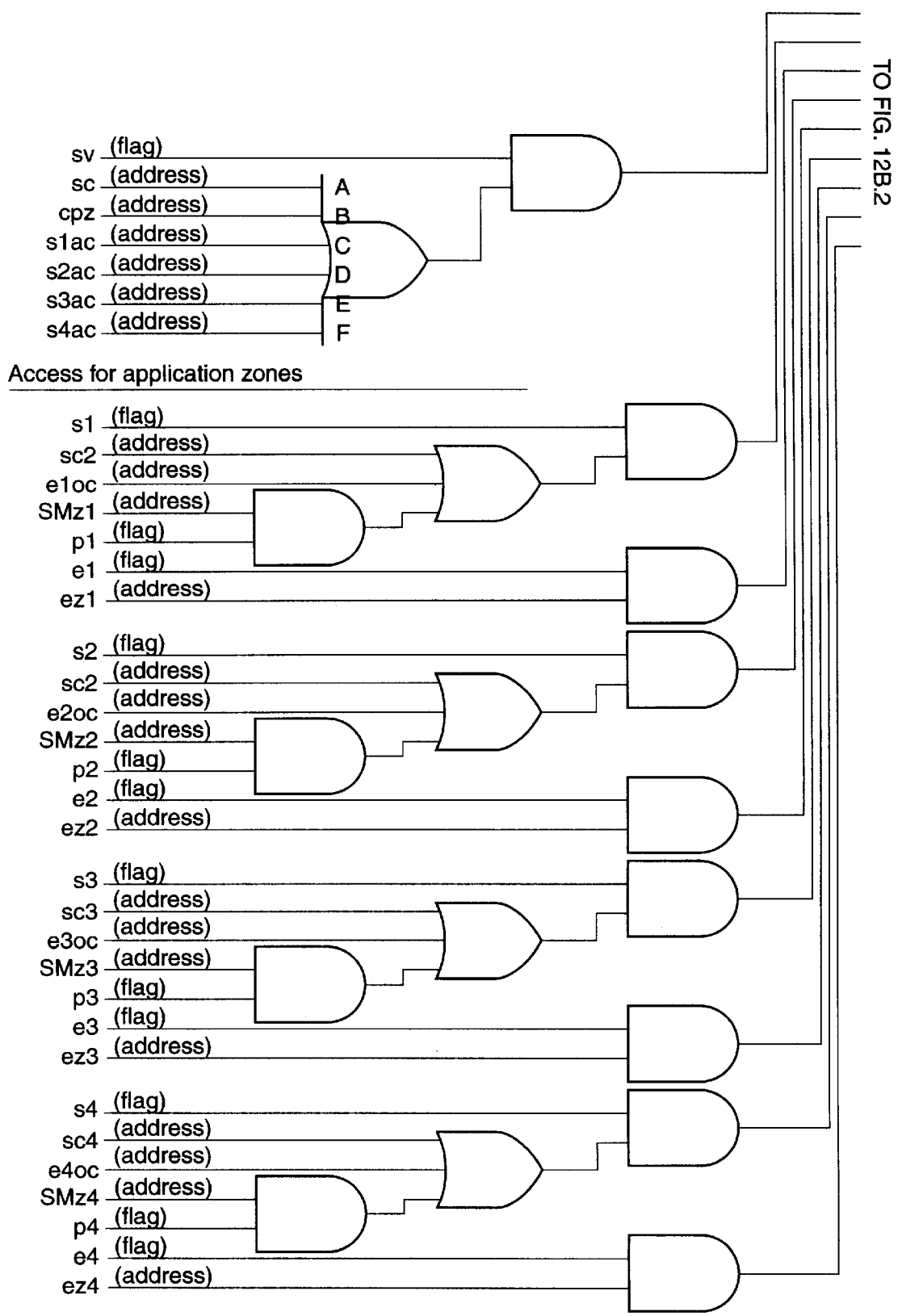
FIG. 12B.1

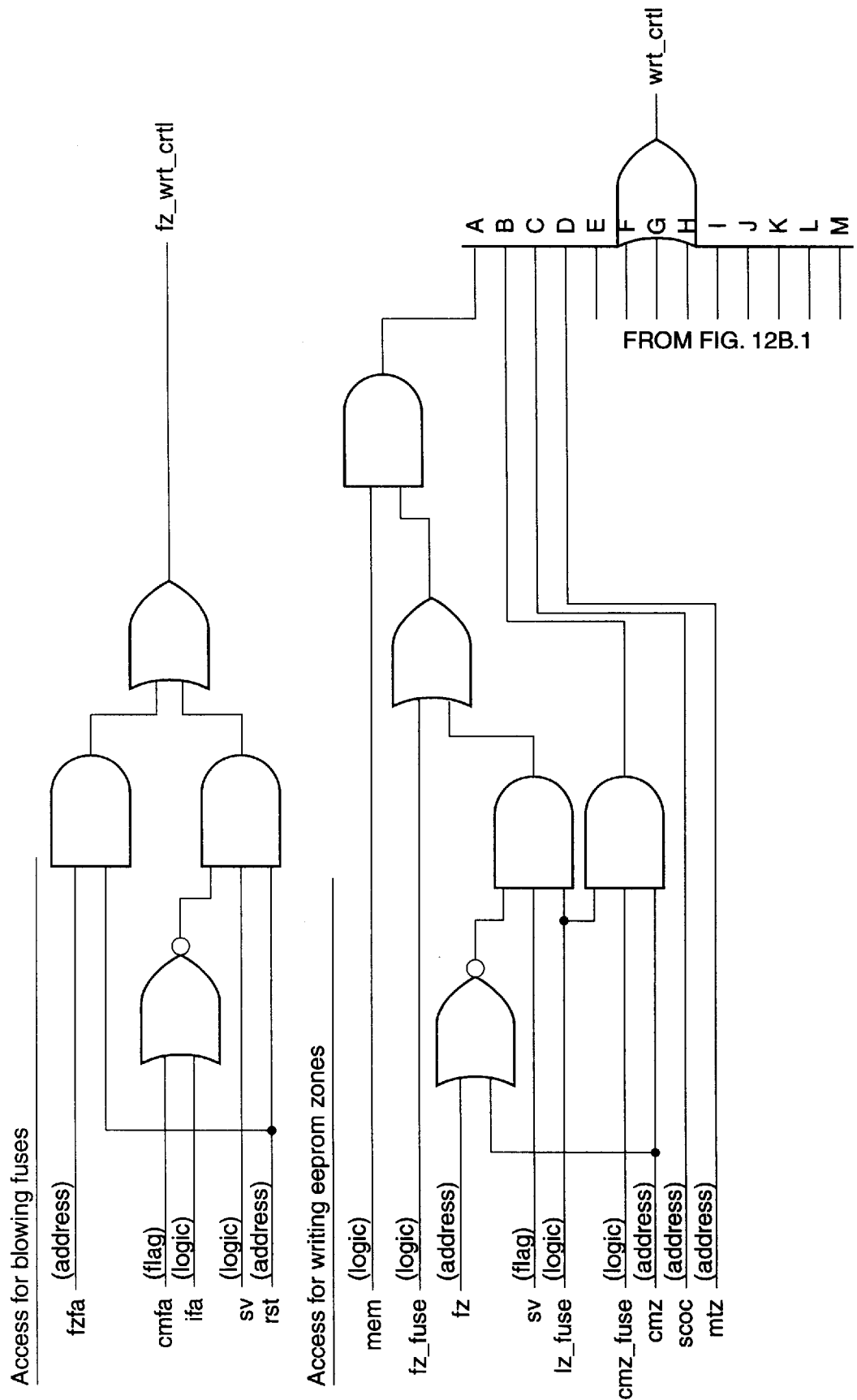
FIG. 12B.2

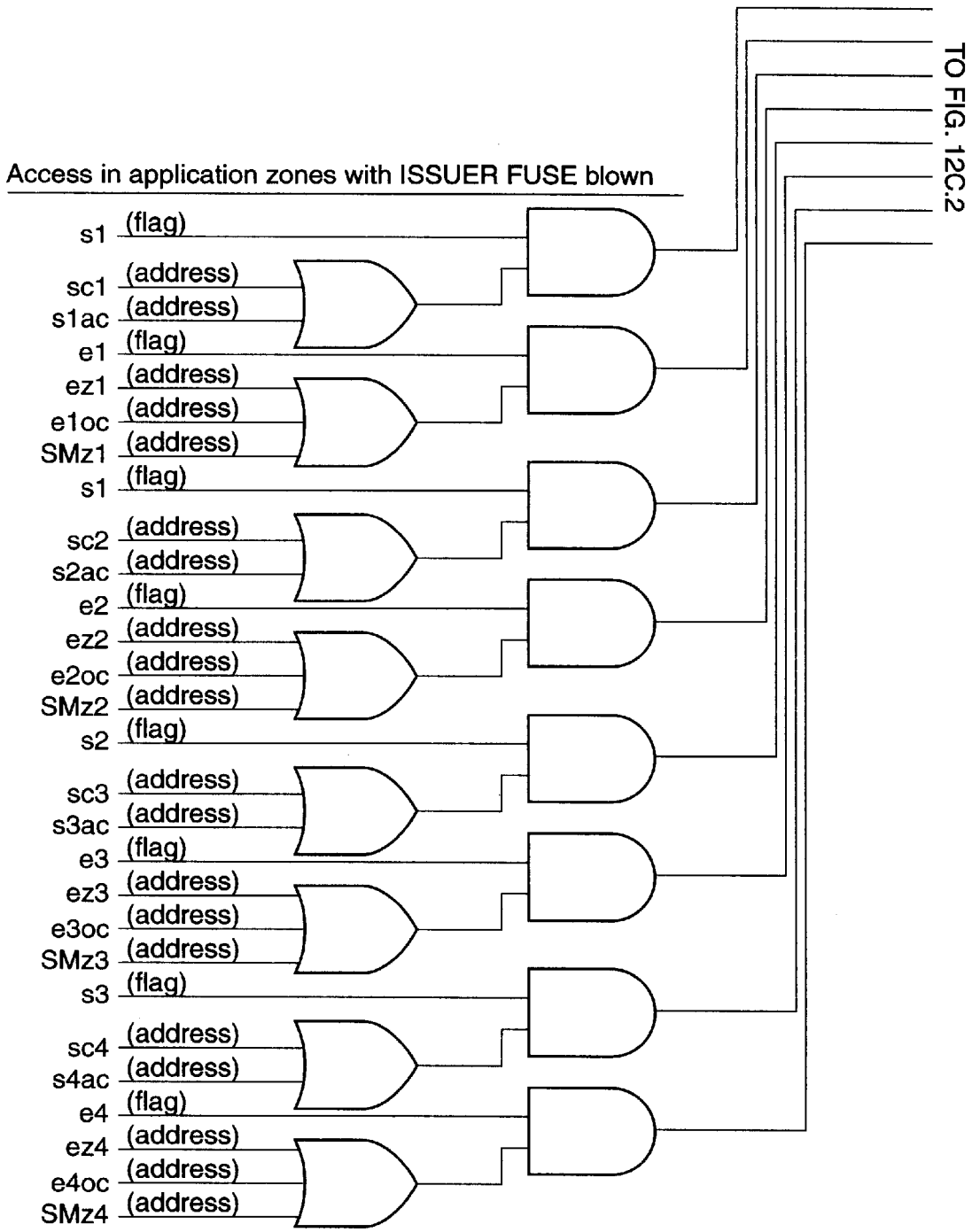
FIG. 12C.1

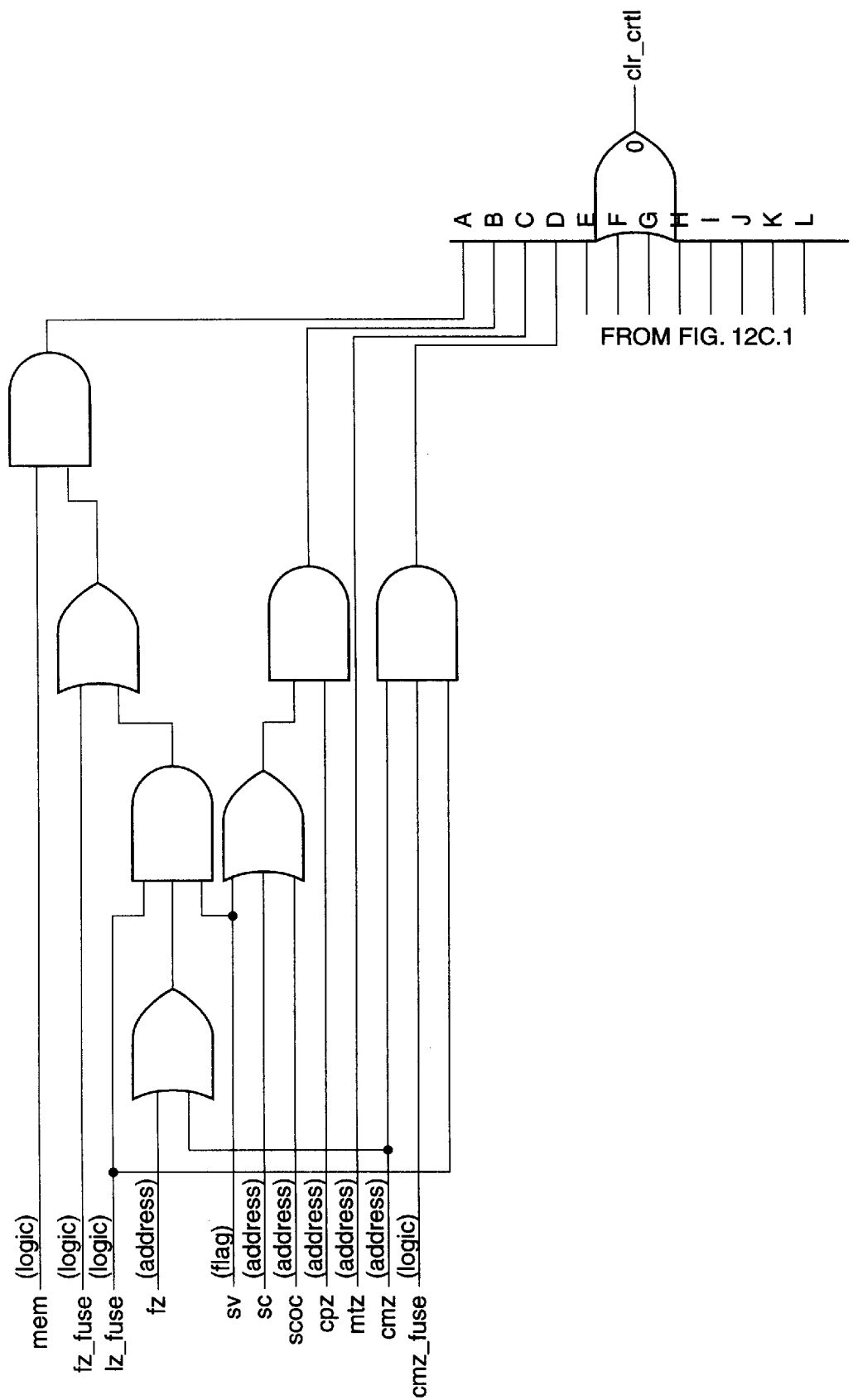
FIG. 12C.2

5,991,519

SECURE MEMORY HAVING MULTIPLE SECURITY LEVELS

BACKGROUND OF THE INVENTION

1. Field Of The Invention

The present invention relates to secured memories. More particularly, the present invention relates to a secured memory which provides multiple levels of security for the application zones.

2. The Prior Art

The use of plastic cards for payment has existed since the 1950's with the introduction of the Diner's Club card. The explosion in their use since that time has been nothing short of phenomenal. Today, millions of cards are issued annually by different organizations, so that their use for both payment and the recordation of information is now almost universal.

Originally, these plastic cards were embossed and had a signature line which could be used for comparison to maintain security. However, as can be imagined, this was not much of a deterrent to fraud and misuse. The first major security improvement was the addition of a magnetic stripe on the back of the embossed card. Plastic cards with a magnetic stripe are probably the most popular form of payment and information card available today. The memory storage provided by the magnetic stripe also permitted the recordation of far greater amounts of information than could be embossed on the face of a plastic card. Though these cards provide some level of protection, it is not all that difficult for the data stored on a magnetic stripe to be read, deleted and rewritten by anyone with access to the appropriate read/write device. Accordingly, it is less than suitable for the storage of confidential data, or for storing a value that can be used in place of currency.

In response to these limitations, a plastic card with a secure memory was developed. These cards are known in the industry as "smart cards". The storage area of the secure memory is often divided into blocks of memory. The object of providing security to a memory is to protect against unauthorized access to and tampering with these blocks. The security is typically provided by some combination of both hardware and software. With a secure memory it is possible to write confidential data that cannot be read or erased, and to prevent writing of data by controlling the reading, writing and erasing with the combination of hardware and software which depend upon particular conditions to occur prior to executing these operations.

An example of a "smart card" with a secure memory, and one which has been widely used is a telephone memory card. These cards are prepaid, and the value stored electronically in the memory is deducted during use by the appropriate amount. Of course, to prevent misuse it is necessary to prevent the user from tampering with the card to increment the stored value. If it were a magnetic stripe card, rewriting a new value to the card could be accomplished easily.

One manner known in the art to prevent tampering with the secured memory to increment a stored value is to provide a secure code that is known only to the issuer of the card. A systematic attack to determine the secure code is deterred by an attempt counter that prevents further use of the card if the number of attempts to present a valid secure code exceeds a predetermined number. When a valid secure code is presented prior to the attempt counter reaching its limit, the attempt counter is reset to zero. Each of these blocks are further protected by an erase code that must be presented before the storage block can be erased. Unfortunately, these erase codes are vulnerable to systematic attack.

Another manner of preventing tampering with telephone memory cards has been to make it virtually impossible to erase a memory cell once it has been written to. For this type of card, a fuse is typically blown which disables the erase function of the memory. Accordingly, as the reduction in the value in the card is made by writing to the memory, the additional value cannot be added to the memory by an erase. Though this is a fairly adequate way to prevent tampering, it is not attractive for the reason that once the value on the card has been depleted, the card cannot be reused by adding additional value to the card.

Accordingly, it is an object of the present invention to provide additional security for memories which are incorporated into devices that require secured memory, such as smart cards.

Further, it is another object of the present invention to provide security for memories which are incorporated into devices with secured memory, such as smart cards, that does not prevent the smart card from being repeatedly reused in its customary manner.

BRIEF DESCRIPTION OF THE INVENTION

According to the present invention, a secured memory comprises a first level security zone having an access code controlling access to said secured memory prior to an issuer fuse being blown, a security code attempts counter preventing access to said secured memory when a predetermined number of attempts at matching said access code have been made prior to resetting said security code attempts counter, a plurality of application zones, each of said plurality of application zones comprising: a storage memory zone, an application security zone having an application zone access code controlling access to said storage memory zone after an issuer fuse has been blown, an application zone security code attempts counter preventing access to said application zone when a predetermined number of attempts at matching said application zone access code have been made prior to resetting said application zone security code attempts counter, an erase key partition having an erase key code controlling erase access to said storage memory zone after an issuer fuse has been blown, and an erase key attempts counter preventing erase access to said application zone when a predetermined number of attempts at matching said erase key code have been made prior to resetting said erase key attempts counter.

BRIEF DESCRIPTION OF THE DRAWINGS

FIG. 1 illustrates a general architecture in block diagram of a secured memory according to the present invention.

FIG. 2 depicts a memory map of an EEPROM memory partitioned according to the present invention.

FIG. 9 depicts a table of access conditions for personalizing the secured memory prior to a fuse being set to logic '0' according to the present invention.

FIG. 11 depicts a table of access conditions for personalizing the secured memory after a fuse is set to logic '0' according to the present invention.

FIG. 12B.1–12B.2 illustrates schematic diagram of a circuit for generating a fuse write control signal and a write control signal according to the present invention.

FIG. 12C.1–12C.2 illustrates schematic diagram of a circuit for generating an erase control signal according to the present invention.

DETAILED DESCRIPTION OF A PREFERRED EMBODIMENT

Figure 3:
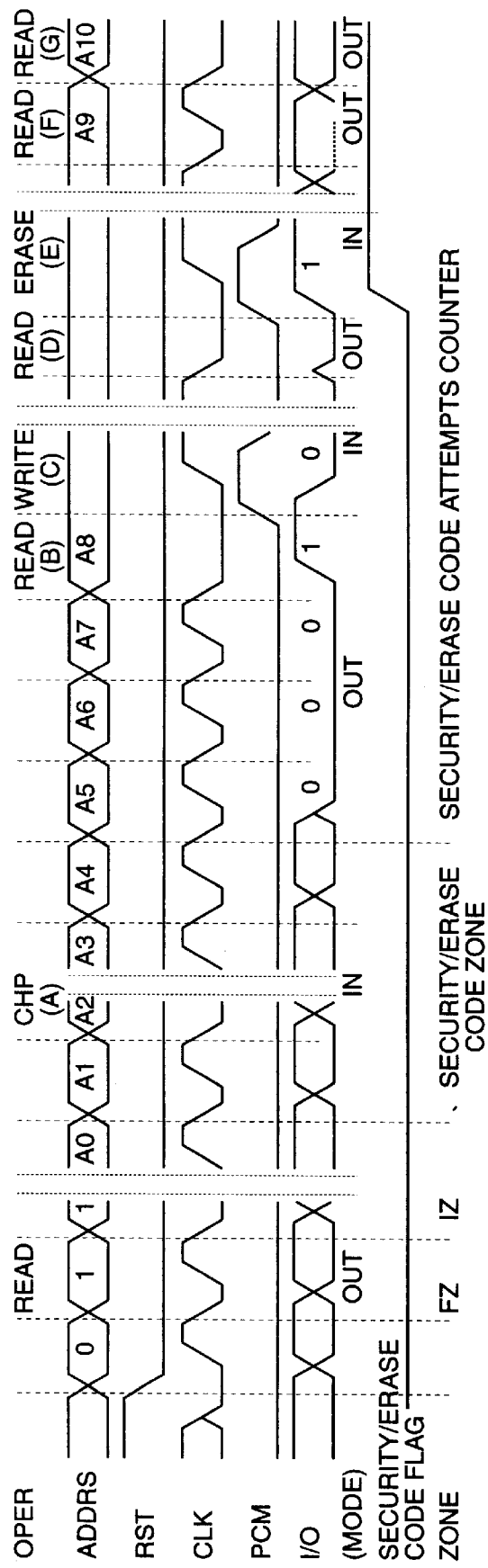
FIG. 3 illustrates a timing diagram of a security code comparison and validation according to the present invention.
Figure 4A:
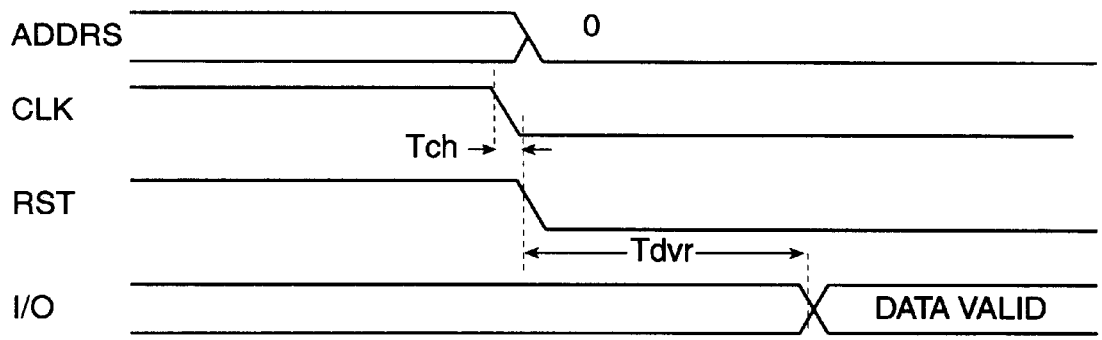
FIG. 4A illustrates a timing diagram of a reset operation suitable for use in the present invention.
Figure 4B:
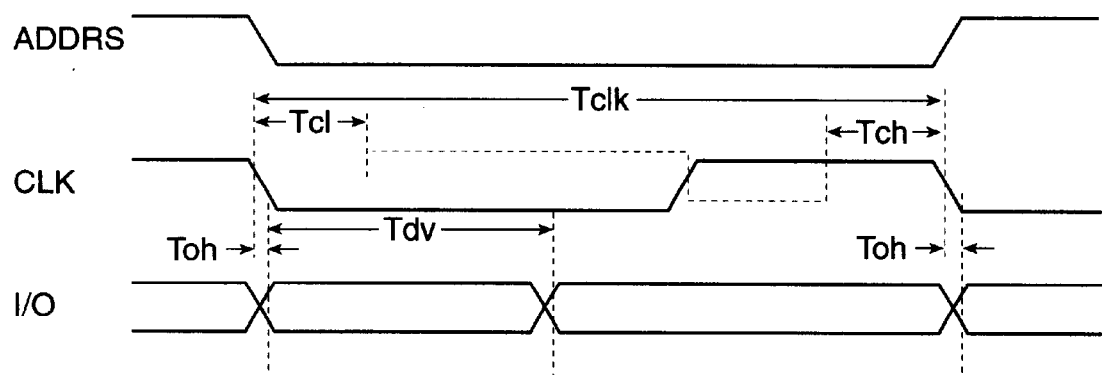
FIG. 4B illustrates a timing diagram of a read operation suitable for use in the present invention.
Figure 4C:
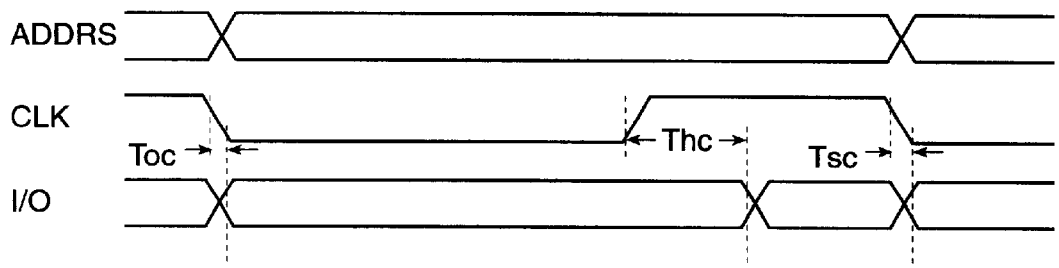
FIG. 4C illustrates a timing diagram of a compare operation suitable for use in the present invention.
Figure 4D:
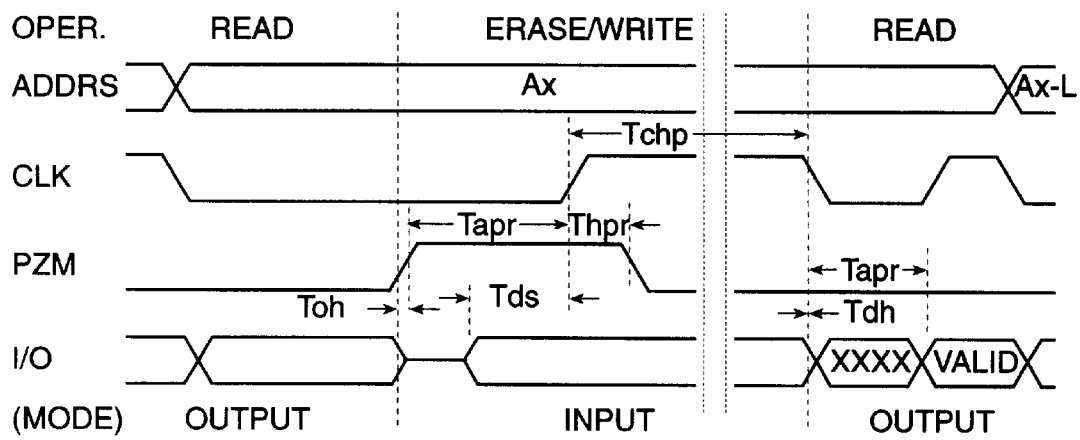
FIG. 4D illustrates a timing diagram of an erase/write operation suitable for use in the present invention.

Those of ordinary skill in the art will realize that the following description of the present invention is illustrative only and not in any way limiting. Other embodiments of the invention will readily suggest themselves to such skilled persons.

Typically, at least three groups of individuals are involved in the handling of a secured memory that is incorporated into a smart card. The first is the manufacturer of the secured memory. The second is the card manufacturer that incorporates the secured memory into the smart card and then distributes the smart card to the end user. (Often the card manufacturing and card issuer or distributor roles are performed by different groups of individuals). The third is the user of the secured memory which has obtained the product from the issuer or distributor. According to the present invention, greater security than is known in the prior art is provided to prevent the unauthorized use of the secured memory by end users or those not involved in the handling of the secured memory.

A block diagram of the generalized architecture of a secured memory 10 according to the present invention is illustrated in FIG. 1. In the secured memory 10, there are blocks for a power on reset 12, address decoder 14, security logic 16, and an EEPROM memory 18. The secured memory 10 has eight pins, namely, VDD, VSS, RST, CLK, PGM, FUS, and I/O connected to the various blocks in the secured memory 10 as shown. As will be explained below, the EEPROM memory 18 is partitioned, and authorized access to the various partitions to perform the operations of READ, WRITE, COMPARE, and ERASE is controlled by the security provided according to the present invention.

In preventing the unauthorized access to the EEPROM memory 18 two potential instances of unauthorized access must be addressed. The first instance arises because of the transmittal of the secured memory 10 from the manufacturer of the secured memory 10 to the issuer of the secured memory 10. To prevent the unauthorized use of the secured memory 10 by those who might intercept the secured memory 10 from the issuer, a security code determined by the manufacturer and conveyed to the issuer must be used by the issuer to gain access to the secured memory. According to the present invention, security is provided to prevent unauthorized use by one other than the end user, and to prevent anyone other than the issuer to tamper with or use the memory in a manner not permitted by the issuer.

Turning now to FIG. 2, a memory map 20 indicating the various memory partitions made to the EEPROM memory 18 is set forth. In memory map 20, the address in the EEPROM memory 18 of each memory partition is identified along with the number of bits for each of the memory partitions. For example, the partition labelled Fabrication Zone, to be discussed below, is found at addresses 0 through 15 in the memory map 20 and is allocated 16 bits. The bits in the EEPROM memory 18 are grouped together as 8-bit words. The memory map 20 of the EEPROM memory 18 has been divided into four sections 22, 24, 26, and 28 for a more ready understanding of each of the memory partitions.

Section 22 of memory map 20 contains partitions for the manufacturer and the issuer. The partitions in section 22 are the Fabrication Zone, Issuer Zone, Security Code, Security Code Attempts Counter, and Code Protected Zone. The Code Protected Zone is also accessible to the end user.

The Fabrication Zone and Issuer Zone each contain information that is pertinent to the manufacturer and the issuer, respectively. The Fabrication Zone is programmed by the secured memory manufacturer, and is not alterable. Access to the Issuer Zone is controlled by a security code flag which is set when a valid security code is recognized by the secured memory 10.

The partition for the Security Code contains the security code which must be matched by the issuer to access the EEPROM memory 18 and to thereby personalize various partitions in the EEPROM memory 18. The security code acts to secure transportation between the manufacturer and the issuer, and as will be explained more fully below, after the EEPROM memory 18 is personalized by the issuer, the security code prevents unauthorized access to the application zones of the EEPROM memory 10. As such, the security code is a global access control for the entire EEPROM memory 18.

The Security Code Attempts Counter tallies the number of attempts made at presenting a security code. The secured memory 10 is locked if the Security Code Attempts Counter records eight non-valid presentations of a security code. The Code Protected Zone is a partition that can be used as a scratch pad wherein READ access is permitted, and WRITE/ERASE operations are controlled by the security code flag.

Section 24 of memory map 20 contains four application zones, that include partitions for both security and memory storage. Each of the four application zones illustrated in memory map 20 includes a partition for a Security Code, a Security Code Attempts Counter, an Erase Key, an Erase Key Attempts Counter partition, and a Storage Memory Zone. Once the EEPROM memory 18 has been personalized by the issuer, the partitions for the Security Code and Security Code Attempts Counter in each of the application zones control read and write access in combination with other security measures, to their associated Storage Memory Zone, and the partitions for the Erase Key and Erase Key Attempts Counter in each of the application zones control erase access, along with other security measures, to their associated Storage Memory Zone. It should be appreciated that to those of ordinary skill in the art, writing to an EEPROM is the process of placing a logic '0' in an EEPROM memory bit and erasing is the process of placing a logic '1' in an EEPROM memory bit.

Section 26 is a Memory Test Zone is provided to test all the operations of the secured memory 10 without the need for security access.

Section 28 is a partition for a Fuse. Once the secured memory 10 is personalized by the issuer, the Fuse partition 28 is permanently "blown" by setting it to logic '0'. It should be appreciated that the bit which is blown is a stand alone bit of EEPROM memory that is set permanently to a logic '0'.

As discussed above, when a secured memory 10 is transmitted from the manufacturer to the issuer, a security code determined by the manufacturer is conveyed by the manufacturer to the issuer. For the secured memory 10 to be accessed by the issuer to personalize the secured memory 10 for the user, the issuer must input the security code conveyed by the manufacturer for comparison with the security code as programmed by the manufacturer of the secured memory into the Security Code partition in section 22 of the memory map 20. For the issuer to gain access to the EEPROM memory 18 there must be an exact match of the security code input by the issuer with the security code programmed by the manufacturer.

To prevent a systematic attack on the secured memory 10 by an unauthorized person, each attempted access to the secured memory 10 by inputting a security code to be compared with the security code programmed by the manufacturer is tallied by the Security Code Attempts Counter in section 22. If eight unsuccessful attempts are made to match a security code to the programmed security code, the ability to set the security flag is no longer possible. Each time an input security code is compared to the programmed security code, and a match is made, the security code attempts counter is reset to zero.

Turning now to FIG. 3, the timing diagram 30 for the successful security code comparison and a setting of the security code flag is shown. In the timing diagram 30, the operations of RESET, READ, COMPARE, WRITE and ERASE are performed. The timing diagrams for the RESET, READ, COMPARE, and ERASE/WRITE operations are set forth in FIGS. 4A through 4D, respectively.

As illustrated in timing diagram 30, to compare a security code with the security code programmed by the manufacturer, a reset signal is first provided to the RST (reset) pin of the secured memory 10. In the RESET operation, the address counter in the address decoder 14 is reset to zero and the first bit of the EEPROM memory 18 is available on the I/O pin after the falling edge of the reset signal. Next, the address counter is incremented by a signal provided to the CLK (clock) pin while the signal provided to the PGM (program/erase) pin of the secured memory 10 is held low until the address of the security code partition is reached. This is a READ operation.

Figure 5:
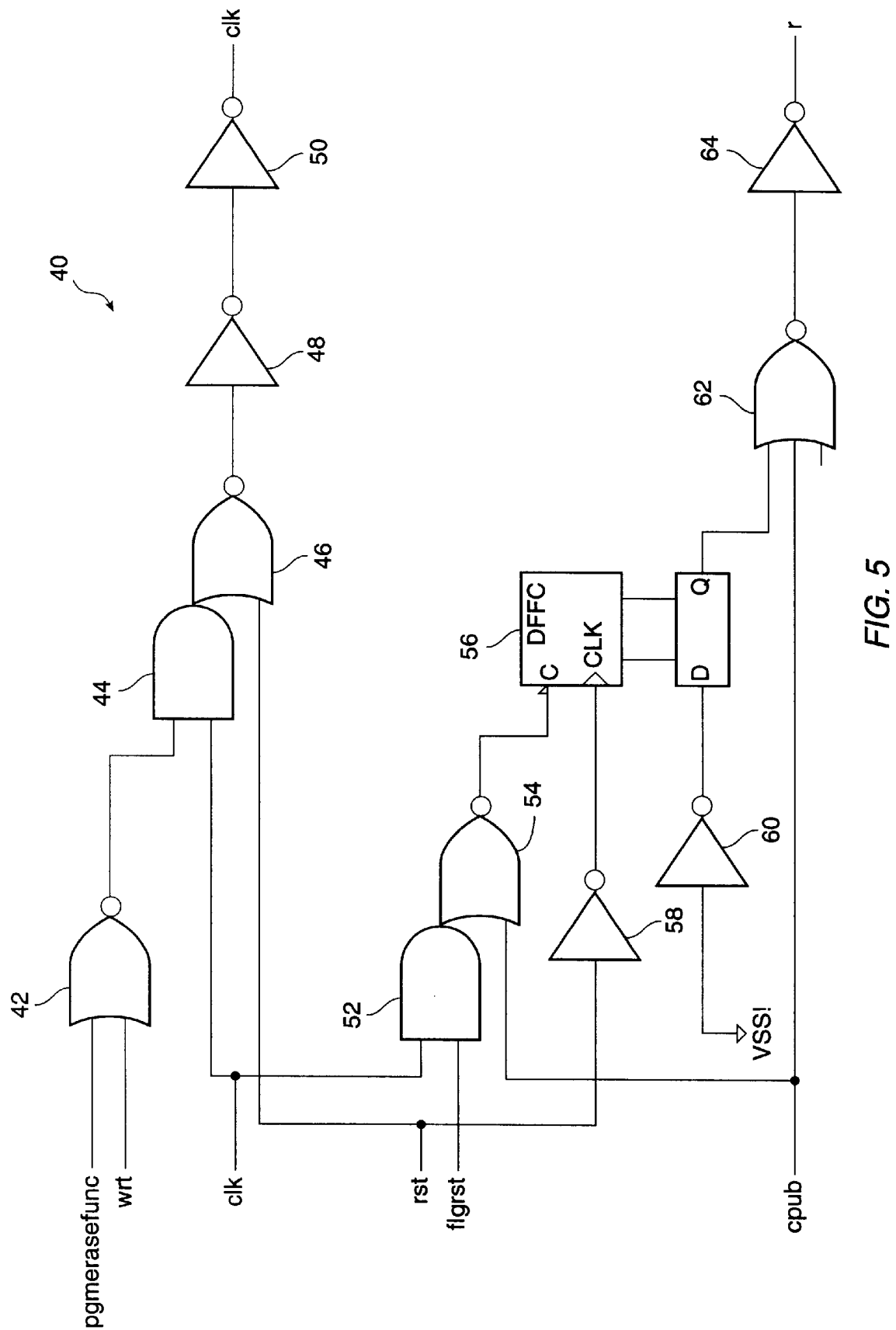
FIG. 5 illustrates schematic diagram of a circuit for controlling the location of the address in the EEPROM memory suitable for use according to the present invention.

The address counter for the EEPROM memory 18 is controlled by the address count control circuit 40 is set forth in FIG. 5. Two signals, CLKR and R are produced by the address count control circuit 40 to control a multi-stage counter that is used to generate the desired address of the EEPROM memory 18. The CLKR signal is an internal clock signal used to increment the address counter, while the R signal is an internal signal used to reset the address counter to zero.

The address count control circuit 40 has the following input signals: PGMERASEFUNC, WRT, CLK, RST, FLGRST, and CPUB. In the address count control circuit, the PGMERASEFUNC and WRT signals are both connected to the inputs of a NOR gate 42. The output of the NOR gate 42 and the CLK signal are connected to the inputs of an AND gate 44. The output of the AND gate 44 and the RST signal are connected to the inputs of a NOR gate 46, and the output of the NOR gate 46 is passed through inverters 48 and 50 to form the CLKR signal. The CLK signal and the FLGRST signal are connected to the inputs of an AND gate 52. The output of the AND gate 52 and the CPUB signal are connected to the inputs of a NOR gate 54 having an output connected to the negative edge triggered clear input of a D-type flip-flop 56. The RST signal is also connected through an inverter 58 to the clock input of the D-type flip-flop 56. The data input of the D-type flip-flop 56 is held HIGH through an inverter 60 connected to Vss. The data output of the D-type flip-flop 56 and the CPUB signal are connected to the inputs of a NOR gate 62, and the output of the NOR gate 62 is passed through an inverter 64 to form the R signal.

The PGMERASEFUNC signal is internally generated by a circuit to be described below. It is generated to suspend the address counter by not passing the CLK signal through AND gate 42 as it toggles, as can be appreciated upon inspection of the address count control circuit 40, when an erase or write cycle is being performed. The RST signal is generated externally to reset the address counter to zero. When the RST signal makes a transition from HIGH to LOW, D-type flip-flop 56 is clocked, and data output D-type flip-flop 56 goes HIGH. As a result, the R signal goes HIGH and the address counter is reset to zero. The FLGRST signal resets the R signal LOW after the address counter has been reset to zero when the R signal went HIGH. The FLGRST signal is generated by the address counter when the address in the EEPROM memory 18 is zero either when the EEPROM memory 18 is reset or the address counter has rolled over to zero. The CPUB signal is generated when the secured memory 10 is powered up.

The output of the address counter is fed into a control word identifier that is employed to generate control word signals to indicate when particular addresses in the EEPROM memory 18 have been reached. The control word identifier also generates a signal for the first bit, the second bit, and the eighth (last) bit of each word in the EEPROM memory 18. As will be described more fully below, the signals generated by the control word identifier are used by the security logic to identify which partition in the EEPROM memory 18 is being accessed, as well as whether the first, second, or last bits of a word are also being addressed.

Figure 6:
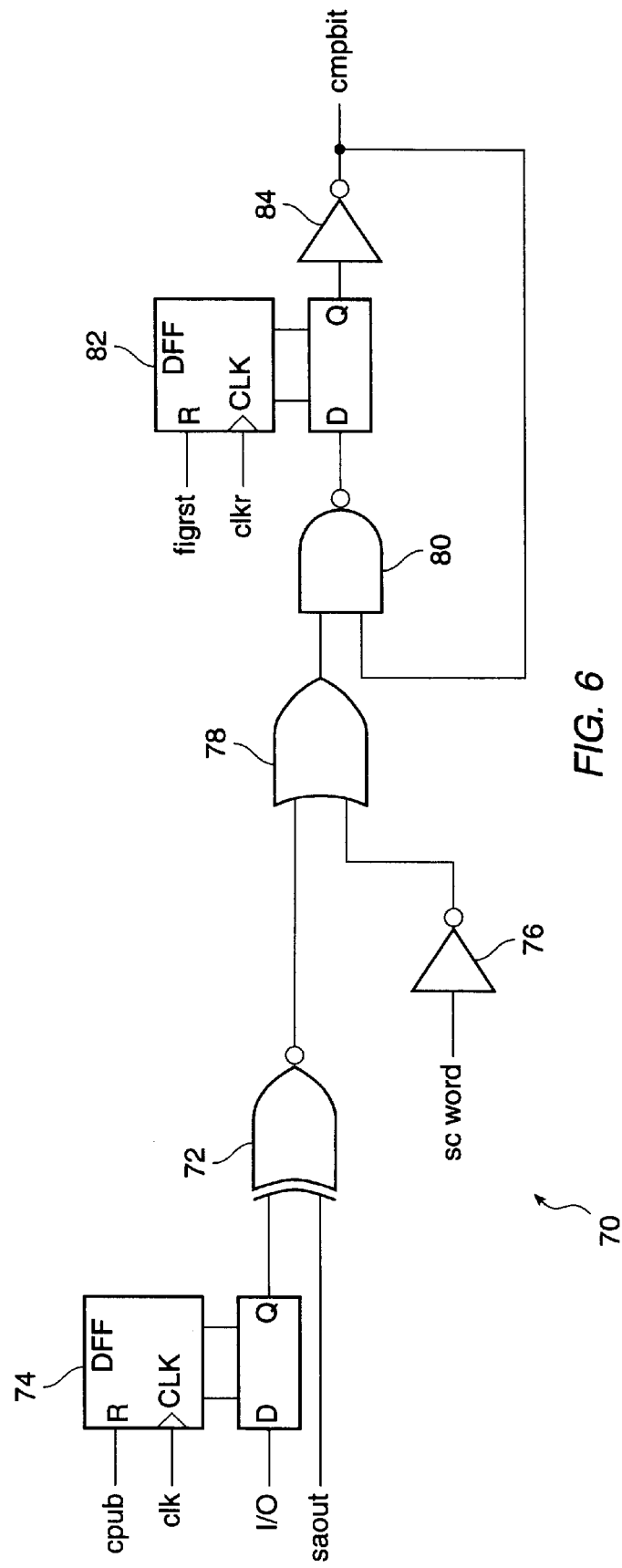
FIG. 6 illustrates schematic diagram of a circuit for comparing a security code suitable for use according to the present invention.

A bit by bit comparison of the programmed security code to the security code presented to the I/O pin is then made as the clock signal increments the address of the programmed security code. The comparison is made by the compare bit circuit 70 illustrated in FIG. 6. In the compare bit circuit 70, data read out from the EEPROM 18 a bit at a time by a sense amplifier on the SAOUT line is compared by XNOR gate 72 with the security code being input on the I/O line as it is clocked through the D-type flip-flop 74. In the COMPARE operation, the address counter is incremented on the falling edge of the clock, and the input data is latched on the rising edge of the clock. The comparison is done on the next falling edge of the clock.

A comparison is made at the time D-type flip-flop 82 is clocked. As the comparison is made, the CMPBIT must remain HIGH for the comparison to indicate a match. For the CMPBIT to be HIGH, both of the inputs to NAND gate 80, must be HIGH, if one of the inputs goes LOW, then the CMPBIT signal will stay LOW. Since, one of the inputs to NAND gate 80 is connected to the output of OR gate 78, the output of OR gate 78 must remain HIGH for the CMPBIT signal to remain HIGH. The inputs to OR gate 78 are the output of the comparison from XNOR gate 72 and the SC WORD signal fed through inverter 76. When the address counter is within the partition containing the security code, the SC WORD signal is HIGH, and as a result, the output of OR gate 78 may not be made HIGH by the SC WORD signal while the address counter is with the partition for the security code. Rather, it is when the bits being compared are the same that the output of XNOR gate 72 is HIGH to provide a HIGH output from the OR gate 78 so that the CMPBIT remains HIGH. If during the comparison, the output of OR gate 78 goes LOW, then the CMPBIT will go LOW and remain LOW. It should be noted that if the power is shut off during the comparison, the COMPARE operation is quit because the D-type flip-flop is reset by the CPUB signal. A FLGRST signal will reset the D-type flip-flop 82, thereby allowing another COMPARE operation.

After a match of the programmed security code to the input security code, a validation operation must be performed. In the validation operation, the Security Code Attempts Counter is incremented and a READ operation is performed until a logic '1' is found in the Security Code Attempts Counter. During a READ operation, the address counter is incremented. In the READ operation, when the address counter is incremented, the first bit is available on the I/O after the falling edge of the clock. It should be appreciated that a Security Code Attempts Counter that has all logic '1's indicates that no unsuccessful attempted matches have been made since the Security Code Attempts counter was reset. At the address in which the logic '1' is found, a WRITE operation is then performed to place a logic '0' at that address location.

Figure 7:
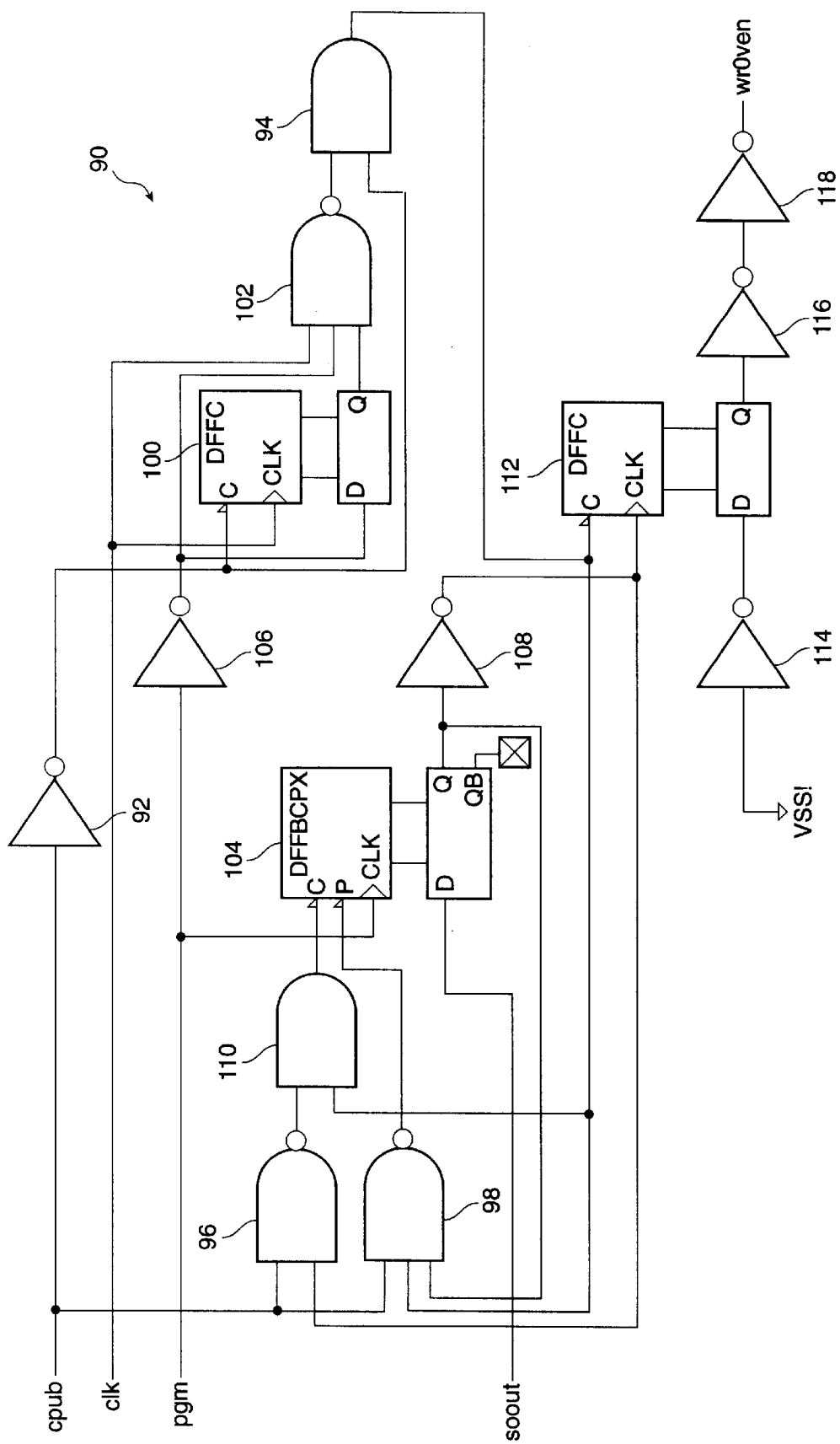
FIG. 7 illustrates schematic diagram of a circuit for write zero verification suitable for use according to the present invention.

The write zero verification circuit 90 is illustrated in FIG. 7. The input signals to the write zero verification circuit 90 are CPUB, CLK, PGM, and SAOUT. The CPUB signal is connected through an inverter 92 to an input of an AND gate 94 and the clear input 'C' of D-type flip-flop 100. The CLK signal is connected to the input of a first NAND gate 96, a second NAND gate 98, the clock input of a D-type flip-flop 100, and a third NAND gate 102. The PGM signal is connected to the clock input of a D-type flip-flop 104, and through an inverter 106 to the data input of D-type flip-flop 100 and to an input of third NAND gate 102. The data output of D-type flip-flop 100 is also connected to an input of third NAND gate 102. The output of third NAND gate 102 is connected to an input of AND gate 94. The SAOUT signal is connected to the data input of the D-type flip-flop 104. Another input of first NAND gate 96 is connected to the data output of D-type flip-flop 104 through an inverter 108. The output of first NAND gate 96 is connected to one input of an AND gate 110, while the other input of AND gate 110 is connected to the output of AND gate 94. The output of AND gate 94 is also connected to the negative edge triggered clear input 'C' of D-type flip-flop 112, and an input of NAND gate 98. The data output of D-type flip-flop 104 is also connected to NAND gate 98, and the inverted output of D-type flip-flop 104 is connected to the clock input of D-type flip-flop 112. Vss is connected to the data input of D-type flip-flop 112 through an inverter 114, and the data output of D-type flip-flop 112 forms the output of write zero verification circuit 90 after passing through inverters 116 and 118.

Referring now to FIG. 7, the validation operation will be explained. When a logic '1' is read from the security code attempts counter following a COMPARE operation, as discussed above, the SAOUT signal should be a logic '1'. As the PGM signal goes HIGH to start a WRITE '0' to the address in the security code attempts counter from which the logic '1' was read, a logic '1' should be latched at the 'Q' output of D-type flip-flop 104. At this point, the WROVEN signal is LOW. If a WRITE '0' occurred, the SAOUT signal will be latched on the next rising edge of PGM.

An ERASE operation is then performed on the Security Code Attempts Counter. This will result in a logic '1' being latched at the output of D-type flip-flop 112 on the rising edge of the clock input of D-type flip-flop 112. It should be appreciated that when a WRITE operation is performed only a single bit is changed, but when an ERASE operation is performed the whole byte is changed. A READ operation is then performed to indicate that the security code flag has been set because an erasure of the Security Code Attempts Counter has been permitted. A READ out of a logic '1' indicates that the security code flag has been set because an erasure of the Security Code Attempts Counter has occurred. A READ out of a logic '0' indicates that the security code flag has not been set because no erasure of the Security Code Attempts Counter has occurred. D-type flip-flop 100, NAND gate 102 and AND gate 94 ensure that the WROVEN signal will be forced to a logic '0' if the power is reset or the address is incremented.

Figure 8:
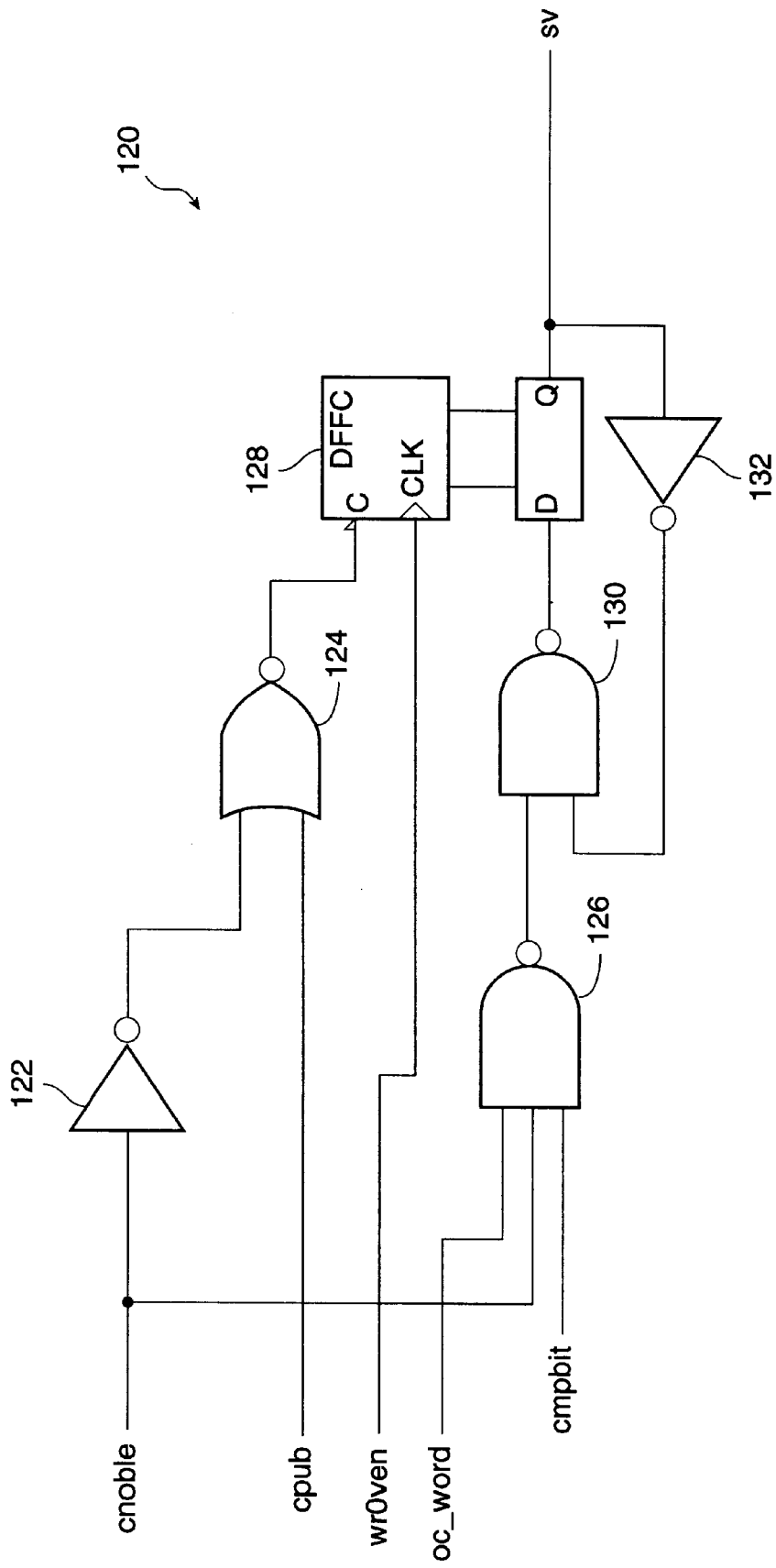
FIG. 8 illustrates schematic diagram of a circuit for setting a security flag suitable for use according to the present invention.

Once a successful COMPARE has been made, and a WRITE operation has been performed, the security code flag will be set by the security flag circuit 120 illustrated in FIG. 8. The inputs to the security code flag circuit 120 are ENABLE, CPUB, WROVEN, ACWORD, and CMPBIT, and the output is SV. The ENABLE signal is connected through an inverter 122 to an input of a NOR gate 124, and also to an input of a NAND gate 126. Connected to two other inputs of NAND gate 126 are the signals ACWORD and CMPBIT. The CPUB signal is connected to another input of NOR gate 124, and the output of NOR gate 124 is connected to the negative edge triggered clear input 'C' of a D-type flip-flop 128. WROVEN signal is connected to the clock input of D-type flip-flop 128. The data input of D-type flip-flop 128 is connected to the output of a NAND gate 130 having a first input connected to the output of NAND gate 126 and a second input connected to the data output of D-type flip-flop 128 through an inverter 132.

Given that the CMPBIT input to NAND gate 126 is still HIGH following the security code comparison, when WROVEN rises, D-type flip-flop 128 will latch a HIGH output SV (Given that ENABLE and AC WORD are also HIGH) SV will remain HIGH as long as power is supplied to the secured memory 10 and ENABLE is HIGH, since the logic '1' on SV feed s though an inverter to NAND gate 130 to input a logic '0' to the NAND gate 130. The input to D-type flip-flop 128 will remain HIGH due to this feedback.

Once the security code flag has been set, the issuer of the secured memory 10 has access to personalize the application zones for the end user. After personalizing the desired portions of the secured memory 10 to which the issuer has access, the value in the Fuse in section 28 is written to a logic '0'. Set forth in table 1 in FIG. 9 are the access conditions for personalizing the secured memory 10 prior to the Fuse being set to logic '0'. To personalize the secured memory 10, the issuer writes or erases the desired data into the secured memory 10 as permitted by the access conditions. In table 1, the code SV represents the security code flag which when set is a logic '1', the code Rn is a read flag for the Application Zones where n=1, 2, 3, or 4 correspond to the four Application Zones, and 'X' indicates a don't care.

As a first example, in the partition for the Security Code Attempts Counter (SCAC) when SV=0, i.e. security code flag not set, only read and write access is permitted, and when SV=1, i.e. code flag set, read, write and erase access is permitted. As a second example, in the partition for the first Storage Memory Zone (SMZ1), when SV=0 and R1=0 no access is permitted, when SV=0 and R1=1 read access is permitted, when SV=1, read, write, and erase access is permitted. In the preferred embodiment, the Rn flag is set by the value in the second bit in each of the four Storage Memory Zones. The Rn flag will remain set until the power of the secured memory is disabled even though the second bit in the particular Storage Memory Zone may be written to a logic '0' by a subsequent operation.

Figure 10:
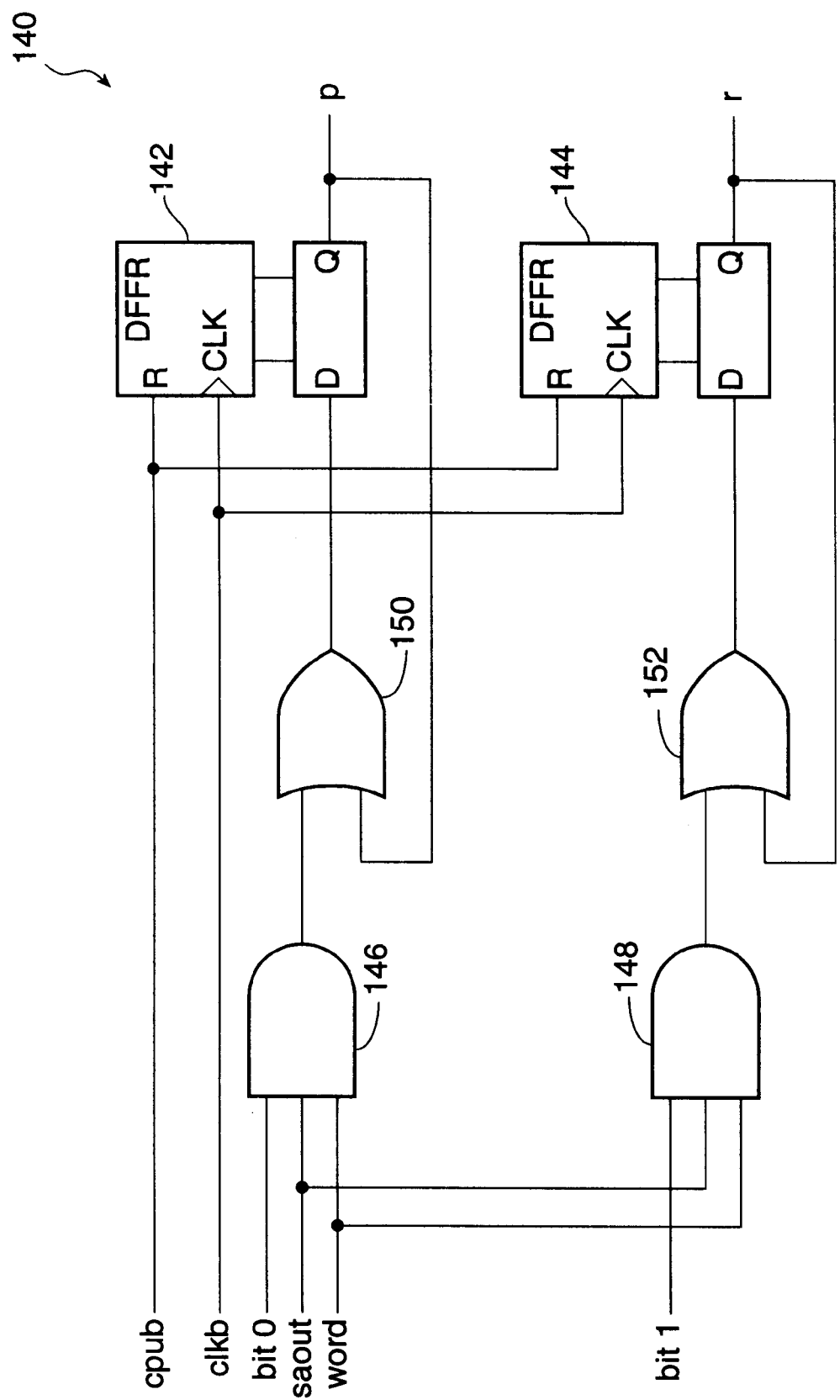
FIG. 10 illustrates schematic diagram of a circuit for setting Rn and Pn flags suitable for use according to the present invention.

Illustrated in FIG. 10 is a P and R flag set circuit 140 which sets the Rn flag. The P and R flag set circuit 140 also sets a Pn flag to be described below. The P and R flag set circuit 140 has input signals CPUB, CLKB, BIT0, SAOUT, WORD, and BIT1. The CPUB signal is connected to a reset input 'R' of D-type flip flops 142 and 144. The CLKB signal is connected to the clock input of D-type flip flops 142 and 144. The SAOUT and WORD signals are connected to the first and second inputs of AND gates 146 and 148, and the BIT0 and BIT1 signals are connected to first inputs of AND gates 146 and 148, respectively. The outputs of AND gates 146 and 148 are connected to a first input of NOR gates 150 and 152, respectively. The outputs of NOR gates 150 and 152 are connected to the data inputs of D-type flip-flops 142 and 144, respectively. The data outputs of D-type flip-flops 142 and 144 are fed back to second inputs of NOR gates 150 and 152, respectively, and also form the Pn and Rn flags.

In the operation of the P and R flag set circuit 140, the BIT0, BIT1, and WORD signals are set by the control word identifier circuit. In setting a particular Rn flag, the address is at the partition in the memory from which the Rn flag is to be read, the WORD signal and BIT1 of that word will be HIGH, and if the value at BIT1 read out on the SAOUT line is also HIGH the RN flag will be set. The Rn flag will remain set until the power of the secured memory is disabled by the CPUB signal. This is true even though the second bit in the particular Storage Memory Zone may be written to a logic '0' by a subsequent operation, thereby forcing the output of AND gate 148 to a logic '0', because the output of D-type flip-flop 144 in being fed back through OR gate 152 will keep the output of OR gate 152 at a logic '1'. The operation for setting of the Pn flag is similar to that of setting the Rn flag, except that the BIT0 signal is employed instead of the BIT1 signal.

Those of ordinary skill in the art can readily appreciate from FIG. 9 which flags must be set to read, write, erase or compare data in the partitions of the secured memory 10. Reading, writing, erasing, and comparing data in the secured memory 10 is accomplished by applying the appropriate sequence of signals to the pins of the secured memory 10 as taught by the timing diagrams in FIGS. 4A through 4D.

For example, to write to the partition for the Security Code in the first application zone, the address of the EEPROM memory 10 is first reset to zero by performing a RESET operation. Those of ordinary skill in the art will recognize that a RESET operation may be performed by applying signals to the pins of the secured memory in the order dictated by the timing diagram for the RESET operation set forth in FIG. 4A. A READ operation is then performed until the address in the address counter is incremented to the initial address to the partition for the Security Code in the first application zone. Finally, a WRITE operation is performed to write the desired data to the address of the Security Code in the first application zone. As set forth above, once the issuer is finished personalizing the secured memory 10 for the end user, the Fuse partition is permanently set to logic '0' to emulate the state of a blown fuse.

Once the fuse has been blown, access to the secured memory is determined according to the access conditions set forth in table 2 in FIG. 11. In table 2, there are three additional codes that were not present in table 1 of FIG. 9. These codes are Sn, Pn, and En. The code Sn represents a security code flag for the four Application Zones where n=1, 2, 3, or 4 correspond to the four Application Zones.

When the security code flag for a particular Application Zone is set, the Sn code is a logic '1'. To set the Sn flag in a particular application zone, a secure code which matches the security code stored in the Secure Code partition of the particular application zone must be presented. The compare and validation operations are performed in the same manner discussed above for the security code found in the Secure Code partition of section 22. The only difference is that the comparison will understandably begin at the address of the Secure Code partition associated with the selected application zone.

The code Pn is a write flag for each of the four application zones. In the preferred embodiment, the Pn flag is set by the value in the first bit in each of the four Application Zones. The Pn flag when set is a logic '1'. The Pn flag will remain set until the power of the secured memory is disabled even though the first bit in the particular Application Zone may be written to a logic '0' by a subsequent operation. The setting of the Pn flag is accomplished as described with respect to FIG. 10.

The code En represents an erase code flag for the four Application Zones. When the erase code flag for a particular Application Zone is set, the En code is a logic '1'. To set the En flag in a particular application zone, an erase code which matches the erase code stored in the Erase Key partition of the particular application zone must be presented. The compare and validation operations are performed in the same manner discussed above for the security code found in the Secure Code partition of section 22. The only difference is that the comparison will understandably begin at the address of the Erase Key partition associated with the selected application zone.

For the end user to obtain access to the various partitions of the EEPROM 18 for reading, writing, erasing and comparing, the correct combinations of the SV, Sn, Pn, Rn, and En flags must be set. As examples, the required combinations of the SV, Sn, Pn, Rn, and En flags that must be set to read, write, erase, and compare in one of the Storage Memory Zones will be discussed.

In the Memory Storage Zones, the access provided by different combinations of flags may be readily understood by dividing the different combinations of flags into three groups. In the first group, Sn=0, and the only access to the Storage memory Zone permitted is a READ operation that may occur when the Rn=1. In the second group, SV=1, Sn=1, and Pn=0. When this set of flags occur, access to the Storage Memory Zone depends upon the En flag. If En=0, then only a READ operation is permitted. Otherwise, if En=1, then READ and ERASE operations are allowed. In the third group, SV=1, Sn=1, and Pn=1. When this set of flags occur, access to the Storage Memory Zone depends upon the En flag. If En=0, then READ and WRITE operations are permitted. Otherwise, if En=1, then READ, WRITE and ERASE operations are permitted.

Accordingly, the following observations should be made. First, the only time a READ from the Memory Storage Zone is not permitted is when both Sn=0 and Rn=0. Second, the only time a WRITE is permitted is when SV=1, Sn=1, and Pn=1. Third, the only time an ERASE is permitted is when SV=1, Sn=1, and En=1.

The circuit diagram of the combinatorial logic for generating the enable signals sent to the EEPROM 18 so that a READ, WRITE, or ERASE, of the data in the EEPROM 18 can be made, and the enable signals for blowing the fuses for personalization as described above is illustrated in FIGS. 12A–12C. One of ordinary skill in the art will readily recognize from FIGS. 12A–12C that the flags must be set as previously described to obtain the desired output enable signals from FIGS. 12A–12C. For example, FIG. 12A generates a read enable signal which is HIGH when the PGMERASEFUNC is LOW, the MEM signal is HIGH, and flags for a selected partition being accessed is also HIGH. To avoid overcomplicating the disclosure, each of these flags which have been described above will not be described again herein.

Figure 12A:
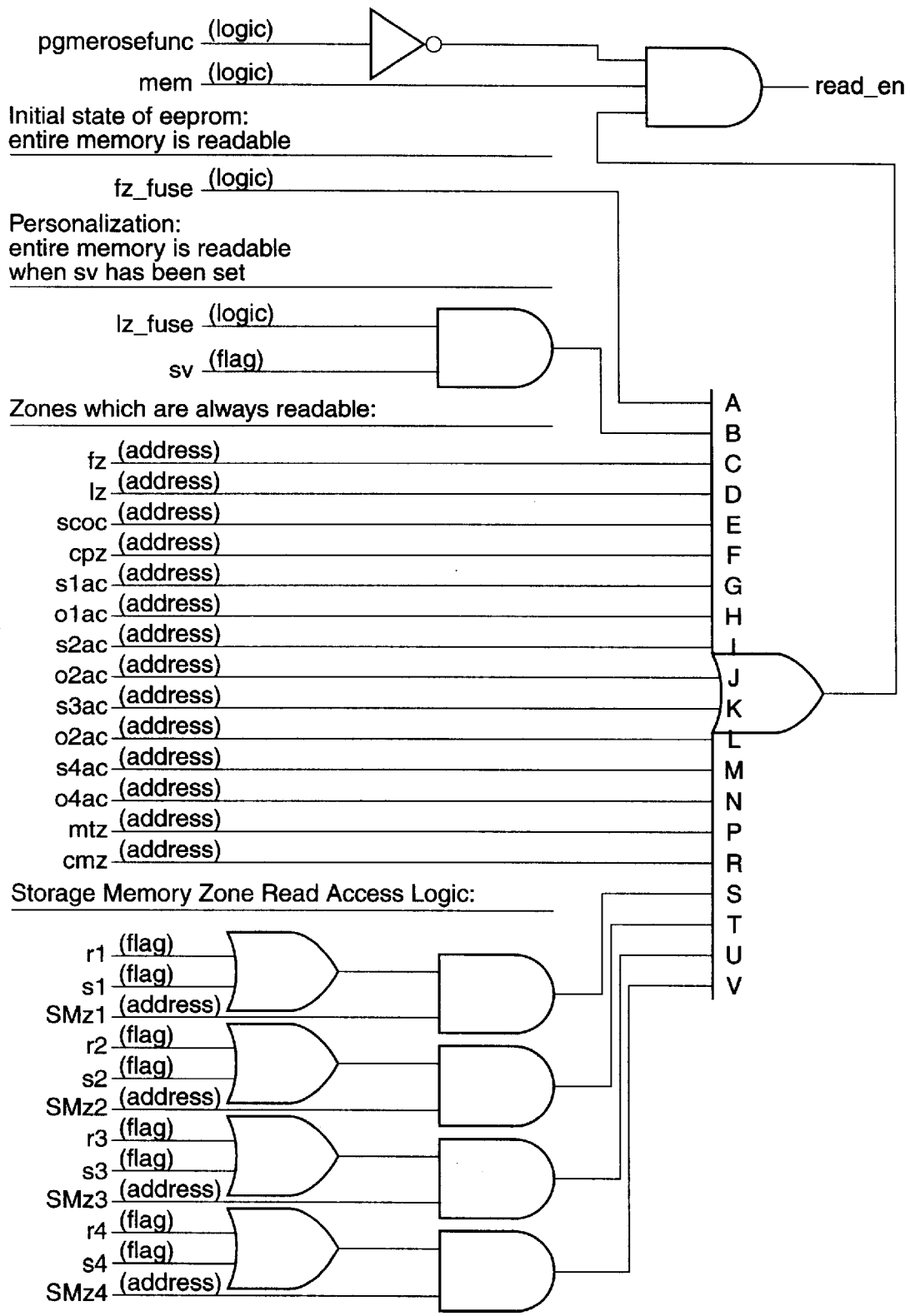
FIG. 12A illustrates schematic diagram of a circuit for generating a read enable signal according to the present invention.
Figure 13:
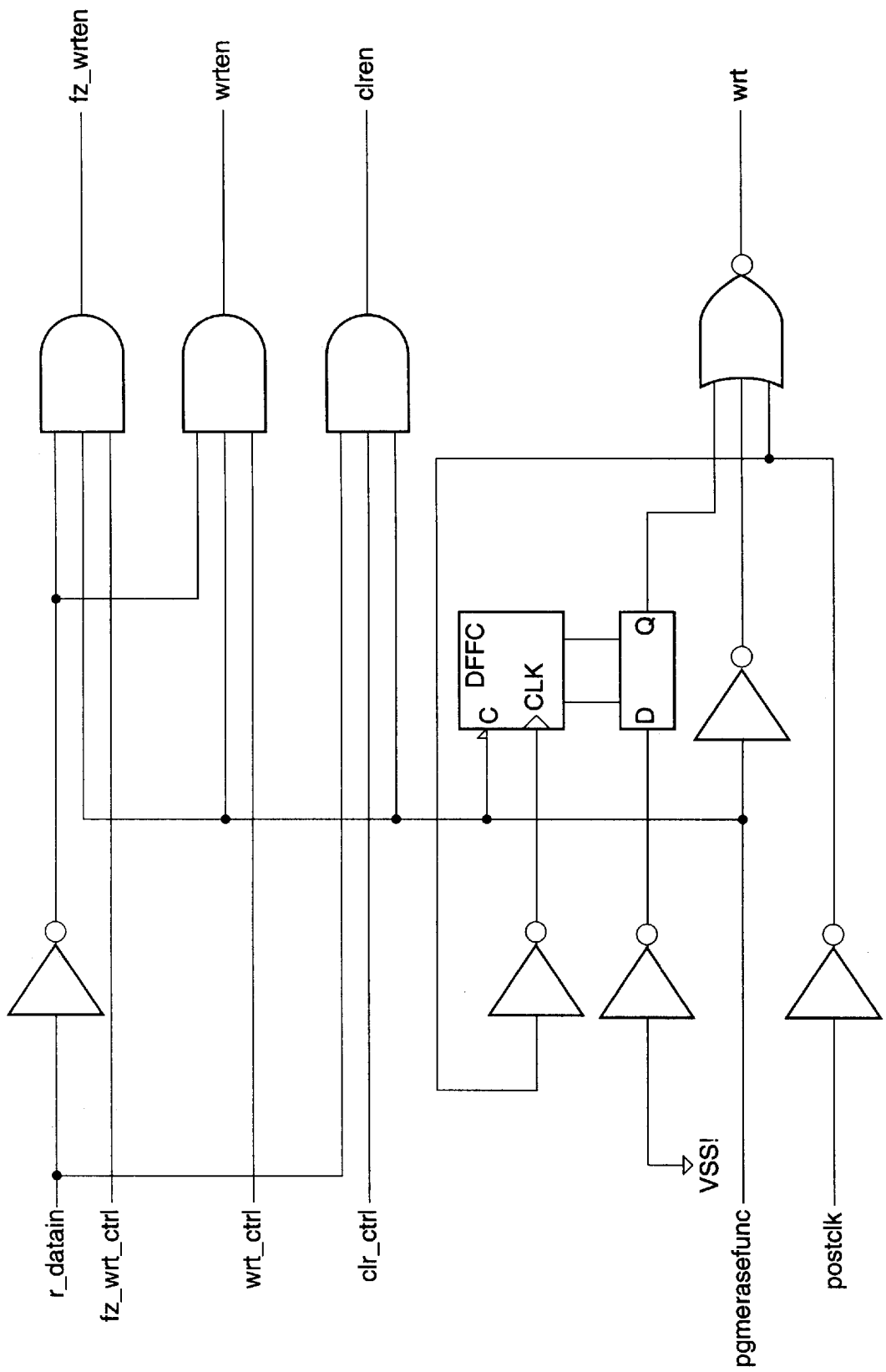
FIG. 13 illustrates schematic diagram of a circuit for generating fuse write, write and erase enable signals according to the present invention.

FIGS. 12B and 12C generate write control (WRT CTRL), fuse write control (FZ WRT CTRL), and clear or erase control (CLR CTRL), respectively, from flags set as described above. The WRT CTRL, FZ WRT CTRL, and CLR CTRL signals are then fed into a write and erase control circuit illustrated in FIG. 13 that generates the signals WRTEN, CLREN, and WRT employed by the EEPROM 18 to write and erase data, and also generates the enable signal for controlling the programming signal for the fuses, FZ WRT EN. Those of ordinary skill in the art will readily appreciate the operation of the circuits set forth in FIGS. 12A–12C, and 13 to generate the enable signals for read, write, erase, and fuse programming according to the flags described above.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A secured memory comprising:

a first level security zone having an access code controlling access to said secured memory prior to an issuer fuse being blown;

a security code attempts counter preventing access to said secured memory when a predetermined number of attempts at matching said access code have been made prior to resetting said security code attempts counter;

a plurality of application zones, each of said plurality of application zones comprising:

a storage memory zone;

an application security zone having an application zone access code controlling access to said storage memory zone after an issuer fuse has been blown;

an application zone security code attempts counter preventing access to said application zone when a predetermined number of attempts at matching said application zone access code have been made prior to resetting said application zone security code attempts counter;

an erase key partition having an erase key code controlling erase access to said storage memory zone after an issuer fuse has been blown; and an erase key attempts counter preventing erase access to said application zone when a predetermined number of attempts at matching said erase key code have been made prior to resetting said erase key attempts counter.

* * * * *

UNITED STATES PATENT AND TRADEMARK OFFICE
CERTIFICATE OF CORRECTION

PATENT : 5,991,519

DATED : Nov. 23, 1999

INVENTOR(S) : Jean-Pierre Benhammou, et al.

It is certified that error appears in the above-identified patent and that said Letters Patent is hereby corrected as shown below:

Title page, item [75] Inventors, "Phillip D. Tonge" should read -- Philip D. Tonge --.

Signed and Sealed this

Eighth Day of August, 2000

Attest:

Q. TODD DICKINSON

Attesting Officer

Director of Patents and Trademarks